United States Patent
Ren et al.

(10) Patent No.: US 10,313,259 B2
(45) Date of Patent: Jun. 4, 2019

(54) SUPPRESSING BROADCASTS IN CLOUD ENVIRONMENTS

(71) Applicant: VMware, Inc., Palo Alto, CA (US)

(72) Inventors: Shu Guang Ren, Beijing (CN); Wei Yao, Beijing (CN); Xianwei Meng, Beijing (CN); Zhiqi Ni, Beijing (CN); Louisa An, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 287 days.

(21) Appl. No.: 15/374,006

(22) Filed: Dec. 9, 2016

(65) Prior Publication Data
US 2018/0167430 A1 Jun. 14, 2018

(51) Int. Cl.
| | |
|---|---|
| G06F 15/16 | (2006.01) |
| H04L 12/875 | (2013.01) |
| H04L 29/08 | (2006.01) |
| H04L 29/06 | (2006.01) |

(52) U.S. Cl.
CPC ............ H04L 47/562 (2013.01); H04L 67/02 (2013.01); H04L 67/34 (2013.01); H04L 69/26 (2013.01)

(58) Field of Classification Search
CPC ... H04L 47/562; H04L 65/4076; H04L 67/02; H04L 67/34; H04L 69/26
See application file for complete search history.

(56) References Cited

U.S. PATENT DOCUMENTS

| | | | | |
|---|---|---|---|---|
| 6,421,321 B1 * | 7/2002 | Sakagawa | ........... | H04L 12/4608 370/238.1 |
| 6,629,145 B1 * | 9/2003 | Pham | ...................... | H04L 29/06 707/999.002 |
| 7,139,818 B1 * | 11/2006 | Kinnear, Jr. | ...... | H04L 29/12273 709/222 |
| 7,337,214 B2 * | 2/2008 | Douglass | .......... | G06F 17/30902 707/E17.12 |
| 7,606,255 B2 * | 10/2009 | Smith | ...................... | H04N 7/16 370/312 |
| 8,219,134 B2 * | 7/2012 | Maharajh | .......... | G06F 17/30035 455/519 |
| 8,631,086 B2 * | 1/2014 | Blocksome | ....... | G06F 15/17331 709/201 |
| 8,738,803 B2 | 5/2014 | Onoue | | |

(Continued)

*Primary Examiner* — Sargon N Nano
*Assistant Examiner* — Thorne E Waugh
(74) *Attorney, Agent, or Firm* — Patterson & Sheridan, LLP

(57) ABSTRACT

A method for suppressing broadcast messages includes receiving a broadcast message from a client that requests configuration information from a configuration server. The method includes queueing the broadcast message in a request queue and then identifying an oldest message in a request queue. When no configuration server information is available, the method includes broadcasting the oldest message to a broadcast domain. The method includes intercepting one or more additional broadcast messages from one or more other clients and storing the additional broadcast messages in the request queue. The method includes receiving a reply to the oldest message and storing configuration server information extracted from the reply. The method includes converting the additional broadcast messages to unicast messages, and unicasting the unicast messages to the configuration server using the stored configuration server information.

20 Claims, 7 Drawing Sheets

(56) References Cited

U.S. PATENT DOCUMENTS

| | | |
|---|---|---|
| 8,856,384 B2 | 10/2014 | Jiang et al. |
| 9,531,676 B2* | 12/2016 | Wang .................. H04L 63/0281 |
| 2004/0022237 A1* | 2/2004 | Elliott ................. H04L 12/6418 |
| | | 370/356 |
| 2007/0254619 A1* | 11/2007 | Salomone ......... H04W 52/0225 |
| | | 455/343.2 |
| 2008/0120129 A1* | 5/2008 | Seubert .................. G06Q 10/06 |
| | | 705/35 |
| 2010/0013625 A1* | 1/2010 | Kouzan .................. H04M 11/04 |
| | | 340/508 |
| 2014/0372516 A1* | 12/2014 | Watte ...................... H04L 51/14 |
| | | 709/203 |
| 2015/0058968 A1 | 2/2015 | Wang et al. |
| 2015/0180824 A1 | 6/2015 | Atanasov |

* cited by examiner

SUPPRESSING BROADCASTS IN CLOUD ENVIRONMENTS

BACKGROUND

Cloud environments can comprise hundreds or even thousands of endpoints, such as virtual machines (VMs) or namespace containers and network interface controllers (NICs). In a cloud environment, messages may be broadcast across a large portion of the network (known as a broadcast area or broadcast domain). These broadcast messages may be used for a variety of functions. One such function of a broadcast message is to find available configuration servers, such as DHCP (dynamic host configuration protocol) servers. DHCP servers provide network devices with valid IP (Internet Protocol) addresses and other configuration information.

In one example, a newly started VM may send a DHCP broadcast to find a DHCP server and receive configuration information in return. In a large cloud environment, this DHCP broadcast is sent to hundreds or even thousands of endpoints to find the DHCP server. When a large number of VMs or other endpoints each independently send DHCP broadcasts across the cloud environment, a broadcast storm can ensue. A broadcast storm is an extreme amount of broadcast traffic that can consume a large amount of network resources and render the network unusable.

SUMMARY

Described herein is a solution, which may be implemented in any number of alternate embodiments, to the problem described above by suppressing broadcasts in a cloud environment. In an embodiment, a method for suppressing broadcast messages includes receiving a broadcast message from a client that requests configuration information from a configuration server. The method includes queueing the broadcast message in a request queue and then identifying an oldest message in a request queue. When no configuration server information is available, the method includes broadcasting the oldest message to a broadcast domain. The method includes intercepting one or more additional broadcast messages from one or more other clients and storing the additional broadcast messages in the request queue. The method includes receiving a reply to the oldest message and storing configuration server information extracted from the reply. The method includes converting the additional broadcast messages to unicast messages, and unicasting the unicast messages to the configuration server using the stored configuration server information.

Further embodiments include a non-transitory computer-readable storage medium comprising instructions that cause a computer system to carry out the above method. Other embodiments includes a processor and a memory that includes a program executable in the processor to perform operations to carry out the above method.

DETAILED DESCRIPTION

Embodiments herein provide techniques for suppressing configuration broadcasts in a cloud environment. The techniques described herein can be utilized for any type of configuration request. As an example, with respect to DHCP requests in a broadcast domain, only limited DHCP requests are broadcast to detect DHCP servers while other DHCP requests are held in queue temporarily. Once the DHCP servers are detected, the requests held in queue are converted to unicast and sent directly to the DHCP servers. Unicast means that the requests contain destination information so that they are transmitted directly to the appropriate server instead of being broadcast across an entire broadcast domain. In addition, information regarding the detected DHCP servers is cached in a switch with a configurable life cycle. When a timeout occurs, the DHCP servers are re-detected to account for any change in the DHCP servers. In another embodiment, BOOTP (Bootstrap Protocol) packets are also queued along with DHCP packets, and are handled similarly to the DHCP packets. The Bootstrap Protocol is a protocol used to automatically assign an IP address to network devices from a configuration server. Any other type of configuration server may utilize the embodiments described herein.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. Of course, alternative embodiments of the structures and method illustrated herein may be employed without departing from the principles described herein.

Figure 1A:
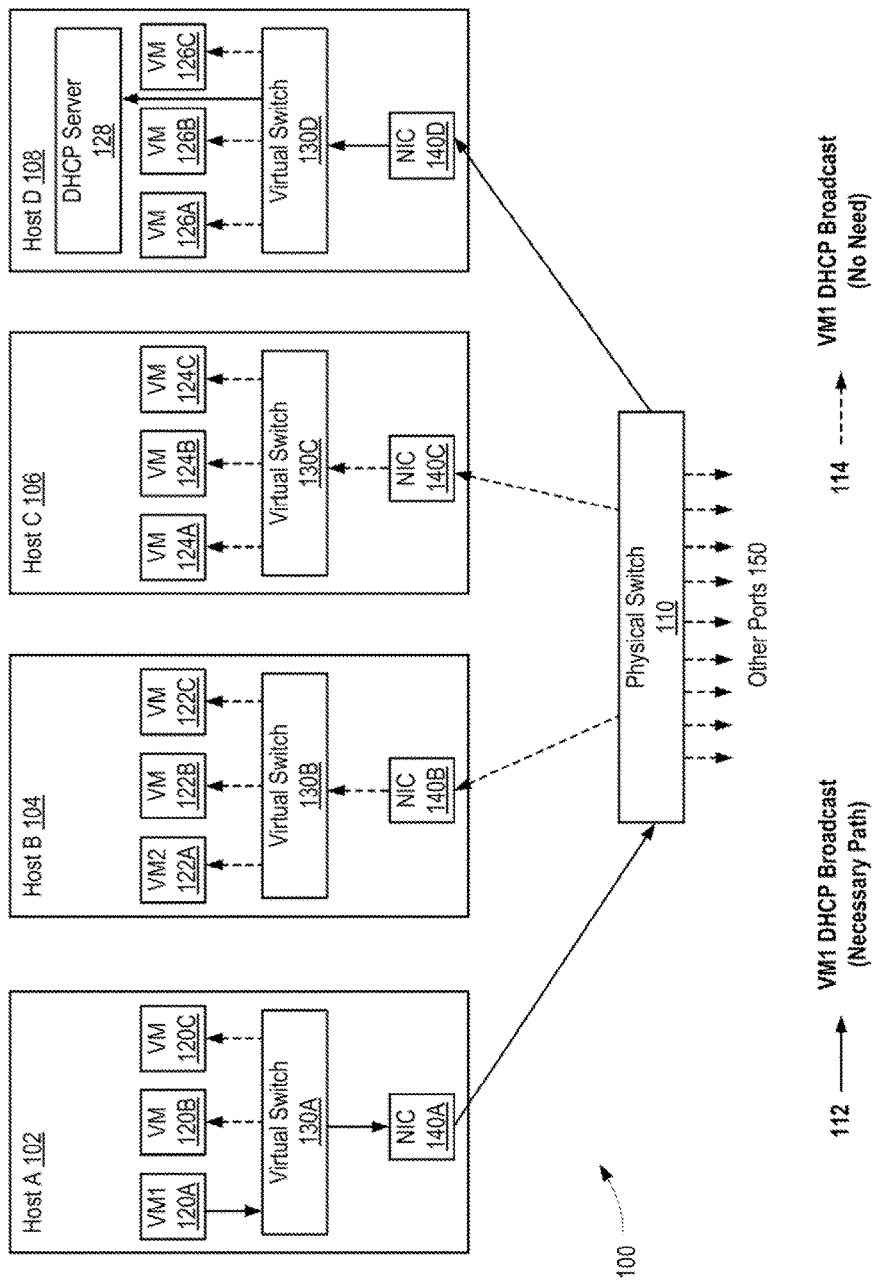
FIGS. 1A and 1B illustrate a cloud environment in which embodiments may be practiced.
Figure 1B:
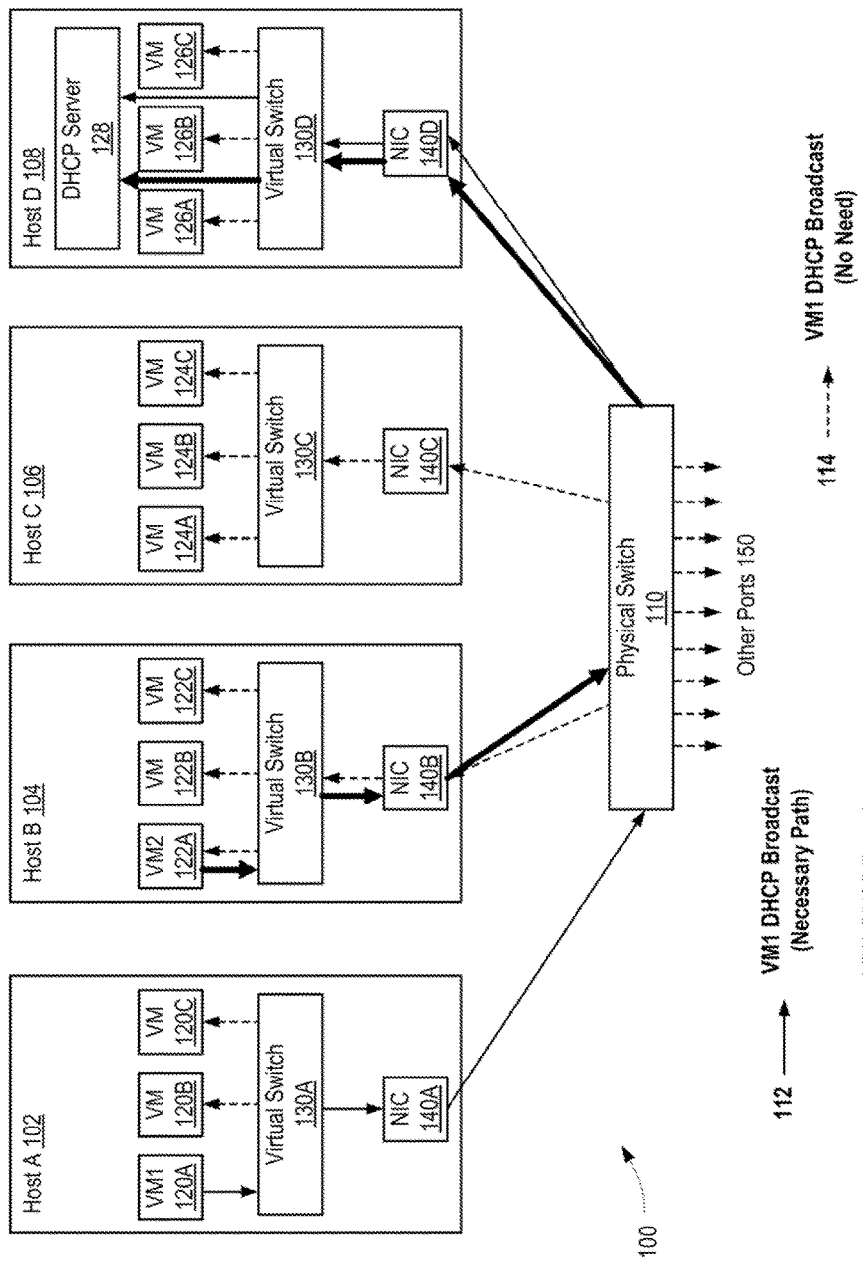

FIGS. 1A and 1B illustrate an example cloud environment 100 in which embodiments may be practiced. FIG. 1A illustrates example broadcasts without broadcast suppression. Hosts 102, 104, 106, and 108 are illustrated to simplify the description and it should be understood that any number of hosts may be present. Each host includes a NIC (network interface controller), labeled NIC 140A-140D. Each host also includes a virtualization layer that abstracts computing resources of a hardware platform for multiple resource consumers, such as virtual machines (or more generally referred to as "virtual computing instances") that run concurrently on the same host. An example hardware platform of a host includes a CPU, memory, storage, networking interface, and other conventional components of a computing device. VMs run on top of the virtualization layer, referred to herein as a hypervisor, which enables sharing of the hardware resources of the host by the virtual machines. One example of a hypervisor that may be used in an embodiment described herein is a VMware vSphere® Hypervisor made commercially available from VMware, Inc. of Palo Alto, Calif.

As illustrated, VMs 120A, 120B, and 120C run in host A 102. VMs 122A, 122B, and 122C run in host B 104. VMs 124A, 124B, and 124C run in host C 106. VMs 126A, 126B, and 126C run in host D 108. A virtual switch is configured in the hypervisor of each of the hosts to connect the VMs to the NICs. A physical switch 110 couples to each host via NICs 140A-140D. Physical switch 110 also couples to other ports 150, which may connect to even more hosts in cloud environment 100.

The arrows illustrated in FIG. 1A represent broadcast messages (i.e., discoveries and requests), which are sent and received in the form of packets to locate configuration servers in cloud environment 100. As noted above, any type of configuration request is contemplated by the described embodiments, but DHCP requests and BOOTP requests are used as examples herein. In the illustrated example, host D 108 is depicted as implementing a DHCP server 128, which may be implemented as a VM. VM 120A in Host A 102 starts up and sends a request to find a DHCP server and acquire an IP address. The location of the DHCP server and other information identifying the server is referred to herein as "DHCP server information." This request from VM 120A is broadcast not only to the DHCP server 128 but to all other endpoints in the cloud environment 100 including VMs 120B-C, 122A-C, 124A-C, and 126A-C, because VM 120A is unaware of the location of DHCP server 128. The solid arrows 112 illustrate the transmission path that is necessary for VM 120A to find DHCP server 128. The dotted arrows 114 illustrate the broadcast messages from VM 120A that would be unnecessary, i.e., messages sent to endpoints other than DHCP server 128, if VM 120A knew of the location of DHCP server 128. In a cloud environment with thousands of endpoints, DHCP requests that are transmitted to locate DHCP server 128 will lead to a broadcast storm if multiple requests are transmitted at about the same time.

As illustrated in FIG. 1A, a large number of the DHCP requests (i.e., arrows 114) can be suppressed if VM 120A knows the location of DHCP server 128. To achieve this benefit for other VMs, when VM 120A receives a response from DHCP server 128, switch 130A stores information about DHCP sever 128 in a cache within the switch. The stored DHCP server information is then read by other switches 130 in system 100 so that any DHCP request from any of VMs 120 can be sent directly (i.e., unicast) to DHCP server 128, instead of broadcasting DHCP requests to the entire broadcast domain. This solution reduces the number of unnecessary DHCP messages in the cloud environment.

FIG. 1B illustrates a cloud environment 100 where certain DHCP broadcast messages have been converted to unicast messages. The components of cloud environment 100 are the same components as illustrated in FIG. 1A and described above. The arrows 112 illustrate the transmission path that is necessary for VM 120A to find DHCP server 128. The dotted arrows 114 illustrate the broadcast messages from VM 120A that are unnecessary, but that are broadcast to the cloud environment because VM 120A is the first VM that attempts to locate DHCP server 128.

VM2 122A starts after VM 120A has broadcast a DHCP request and located DHCP server 128. Therefore, when VM2 122A desires to locate DHCP server 128, VM2 122A sends a broadcast DHCP request to a virtual switch 130B provisioned for VM2 122A. However, virtual switch 130B does not broadcast the request right away but holds it in a queue temporarily. While the message is held in the queue, virtual switch 130B checks the cache in virtual switch 130B to see if the DHCP server information is stored therein. If the DHCP server information is stored therein, virtual switch 130B sends the DHCP request directly to DHCP server 128 as a unicast message instead of broadcasting it (the unicast path is illustrated as thicker black arrows 116). DHCP server 128 then assigns the requesting entity, VM2 122A, an IP address and transmits the IP address to the requesting entity through virtual switch 130B. As seen in FIG. 1B, virtual switch 130B did not have to broadcast the DHCP request from VM2 122A to every endpoint in cloud environment 100. Instead, the DHCP request is unicast to DHCP server 128 when the DHCP server information is known. If the DHCP server information is not stored in virtual switch 130B, virtual switch 130B broadcasts the DHCP request to the broadcast domain to locate the DHCP server Subsequent DHCP requests from other endpoints in cloud environment 100 are similarly unicast for a specified period of time. When one of the switches 130 receives DHCP server information, that information is shared among the other switches 130 via a controller (discussed in further detail below). That way, DHCP requests from any endpoint in cloud environment 100 can be unicast to DHCP server 128 via the respective switch 130. The specified period of time is a configurable life cycle for the DHCP server information for each switch. That is, the DHCP server information is used to unicast requests to the DHCP server for only the specified period of time (the life cycle). When the life cycle expires, the DHCP server information is deleted from the cache in the respective virtual switch 130. Then, a request stored in the queue that has not yet been unicast to the DHCP server 128 is selected and that request is broadcast to the broadcast domain to re-detect a DHCP server. This timeout and re-detection process allows for any change in DHCP servers to be detected periodically.

Figure 2:
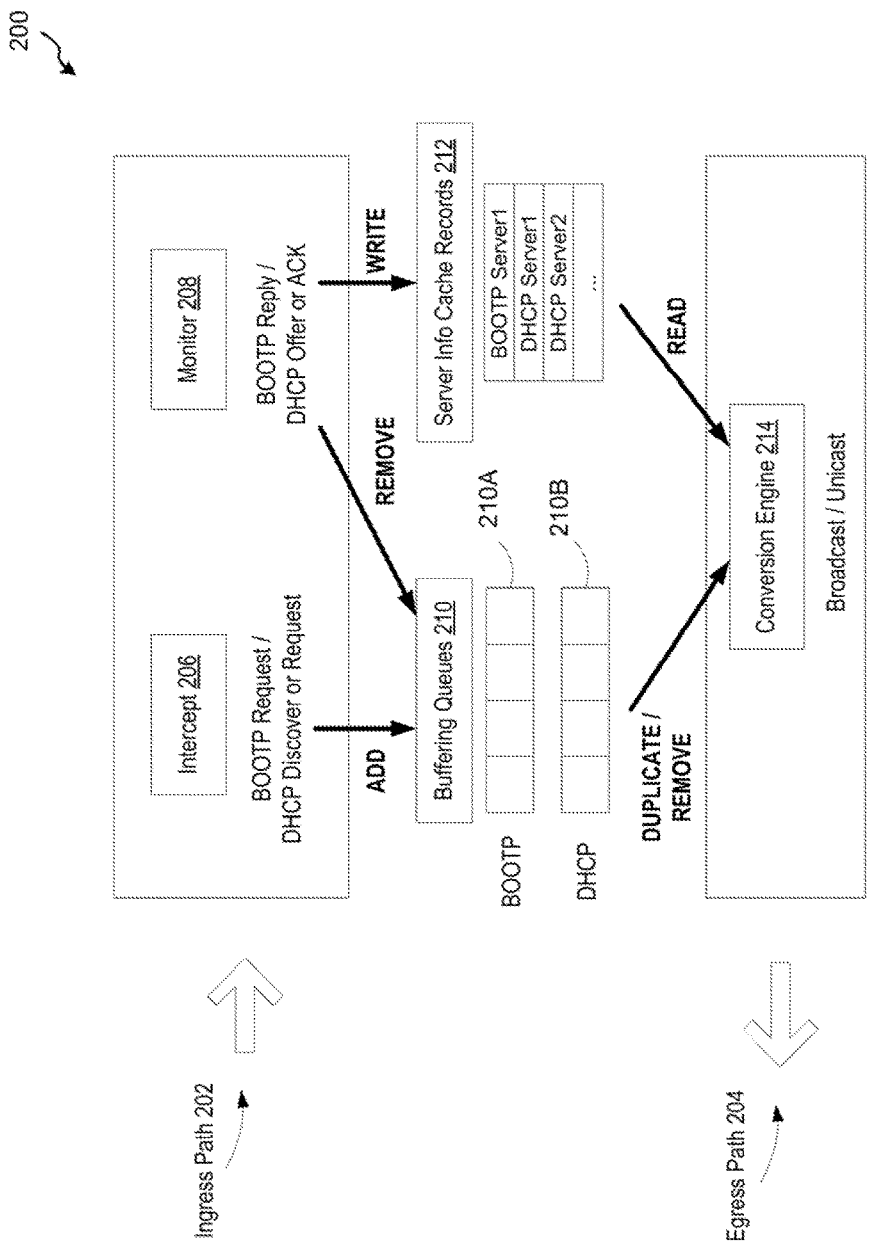
FIG. 2 illustrates a DHCP broadcast suppress module in a broadcast domain according to an embodiment.

FIG. 2 illustrates an example conversion module 200 according to an embodiment. In one embodiment, each virtual switch includes its own instance of module 200. Module 200 contains four main parts. First is a DHCP broadcast intercept 206 and DHCP reply monitor 208 sub-module in ingress data path 202. Second is the DHCP broadcast conversion engine 214 sub-module in the egress data path 204. Third is the broadcast packet buffering sub-module that buffers requests into buffering queues 210A and 210B. Fourth is the server information cache records sub-module 212. The first and second sub-modules are package handling sub-modules. The third and fourth sub-modules are data management sub-modules. The data management sub-modules have timers for performing periodic cleanup work.

As illustrated in FIG. 2, BOOTP (Bootstrap Protocol) requests may also be supported. BOOTP is used in Internet Protocol networks to assign an IP address to network devices from a configuration server. The BOOTP requests may be handled alongside DHCP requests. BOOTP requests, in general, have higher priority than DHCP requests. Therefore BOOTP and DHCP requests are separated into different queues 210A and 210B, which can be of any appropriate size. The packets stored in the BOOTP queue 210A and the DHCP queue 210B may be given different timeouts when they are placed into the queues. The first (i.e., the oldest) packet placed in a given queue is broadcast to locate either the BOOTP server or the DHCP server. The subsequent packets wait for server information to be stored in the cache so that those requests can be unicast to the appropriate server. If a timeout for a packet occurs before the server information is stored in the cache, the packet is broadcast to the broadcast domain. For BOOTP requests, the timeout is usually shorter than the timeout for DHCP requests.

For ingress DHCP intercept and monitor, all BOOTP and DHCP packets received at ingress 202 are handled by module 200. Requests from the clients (such as DHCP requests from VMs) are buffered into the appropriate queues 210A or 210B. These requests are either broadcast or unicast in the egress path 204. Then, unicast packets returned from a server (such as packets from DHCP server 128) in response to a request are checked and key information is extracted. This information may include the broadcast domain that the packet belongs to, the destination MAC (media access control) address of the client that the DHCP server 128 is replying to, and/or the DHCP server 128's MAC address and IP address. That information is saved in cache records 212, and can be used by the switches 130 to unicast subsequent requests. Also, once a client has received a reply from a DHCP or BOOTP server, the packets of the requesting client that are held in queues 210A and/or 210B can be removed.

When buffered packets are sent out egress path 204 to the broadcast domain, conversion engine 214 determines whether to broadcast or unicast the request. Conversion engine 214 will unicast if there is any usable server information stored in cache records 212. As mentioned above, BOOTP packets get higher priority, and are therefore transmitted before DHCP packets. When the process is first performed, the oldest DHCP request is broadcast to the broadcast domain to locate a DHCP server. Once the DHCP server replies back, the DHCP server information is added to cache records 212. In some embodiments, there may be more than one DHCP server in the cloud environment, each of which will respond to a broadcast DHCP request with a unicast DHCP offer. Therefore DHCP server information for more than one server may be stored in cache records 212. In that case, unicast conversion is performed when all DHCP servers' information has been cached. That is, after receiving an offer from each of a plurality of DHCP servers, and having cached each DHCP server's information into cache records 212, subsequently intercepted DHCP requests are replicated and unicast to every one of the servers whose information is stored in cache records 212. The decision of choosing which DHCP server to respond to is left to the client as defined by the DHCP protocol.

In some special cases, certain clients may only be able to receive IP addresses from certain DHCP servers. The information regarding previously discovered DHCP servers stored in cache records 212 may not include the specific server needed by that client. In that case, the packet is buffered until the packet timer times out. After time out, the packet is broadcast in order to find the special DHCP server.

Buffer queue management includes the management of queues 210A and 210B. Actions that are performed on queued packets include adding, duplicating, or deleting. Adding packets to the queue is done by ingress intercept sub-module 206, which identifies the packet as either a BOOTP or DHCP broadcast packet, places the packet into the proper queue, and marks the packet with the MAC address of the source (i.e., the client). The timer is also set for each packet. Duplication occurs when available server information is stored in cache records 212. Conversion engine 214 duplicates the packet in order to unicast the packet to the appropriate server.

Deleting a packet from the queue is performed in one of three ways. First, when a server reply (BOOTP reply, DHCP OFFER, or ACK) is received, there is no need to buffer the client's request anymore, and the packet is deleted. Second, if there is no server information in cache records 212, a broadcast request needs to be transmitted to discover the server. Therefore, the oldest packet in the queue is chosen to be broadcast and then deleted from the queue. Third, if a converted unicast packet is transmitted to a server but no reply is received, the packet timeout will trigger and the packet will then be broadcast and deleted from the queue. This third scenario may occur, for example, if DHCP servers are down or changed after the DHCP server information is stored in cache records 212, or if the cached server cannot serve to this particular client.

In one embodiment, switch 130 saves the device records into separate lists for different types of broadcast domains (e.g., VLAN segments, VXLAN logical networks, etc.) as further described below with reference to FIG. 6. The VLAN (virtual local area network), VXLAN (virtual extensible local area network), or other broadcast domain type that is associated with a DHCP or BOOTP reply is referred to as its broadcast domain. On receiving a reply from a server, DHCP or BOOTP information is extracted as described above and checked if it is already saved in cache records 212. If it is not already saved, it is added to cache records 212. If this information is the first information saved for a specific broadcast domain, the timer is set for this broadcast domain. Upon timeout, the server records are removed for this one broadcast domain. This helps to ensure fresh information in cache records 212 in case the server changes or becomes unavailable for the broadcast domain. This periodic clean-up is useful to remove servers that are no longer operable from cache records 212.

Figure 3:
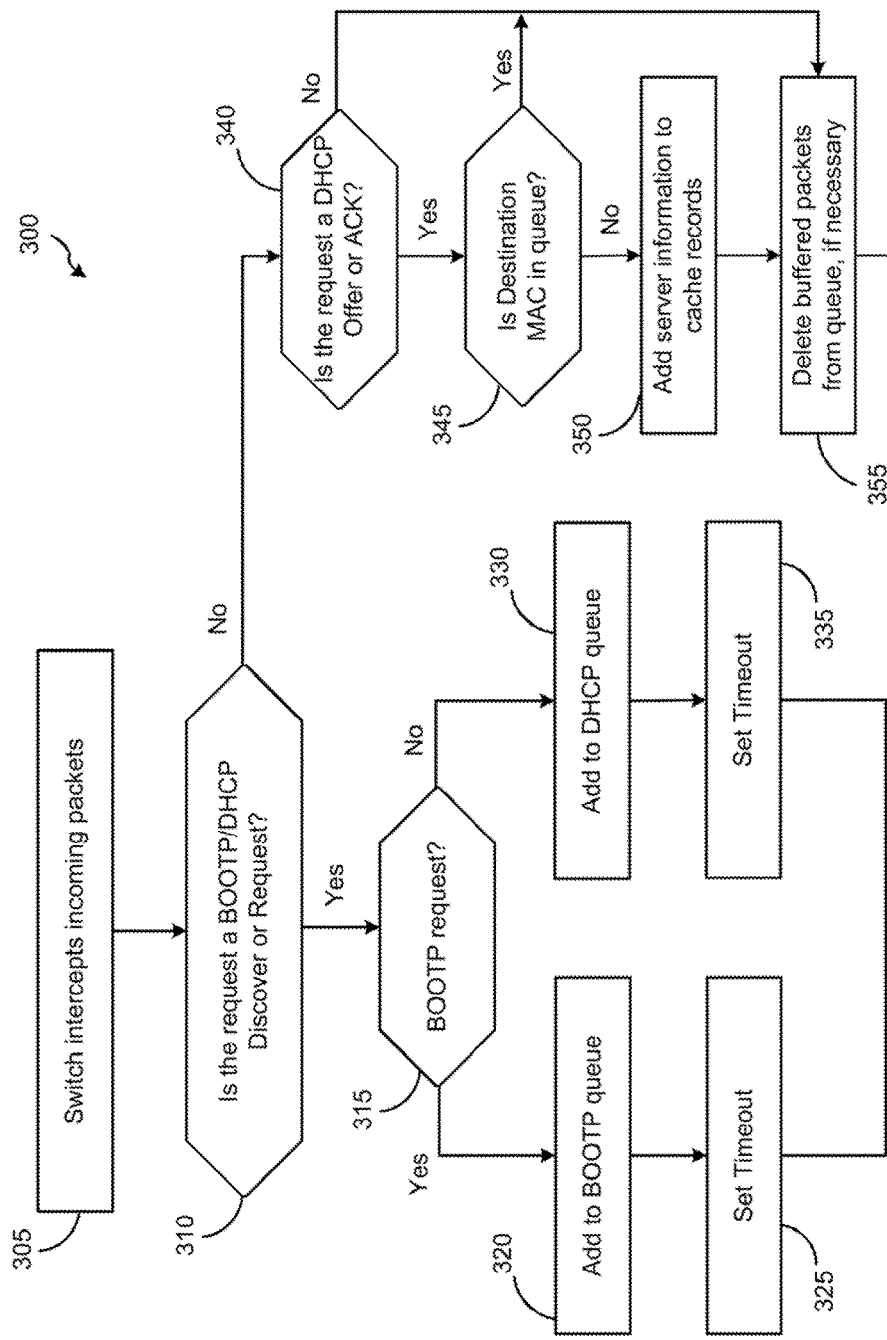
FIG. 3 is a flow diagram illustrating a method for ingress DHCP intercept.

FIG. 3 is a flow diagram that illustrates a method 300 for ingress DHCP intercept, according to one embodiment of the present invention. Although the method steps are described in conjunction with FIGS. 1-2, any system configured to perform the method steps, in any suitable order, falls within the scope of the present invention. In various embodiments, a virtual switch or physical switch can perform the steps illustrated in FIG. 3, such as the virtual switches and physical switches illustrated in FIGS. 1A and 1B.

The method 300 begins at step 305, where the switch intercepts one or more incoming packets. The packets may come from clients or from servers. The method proceeds to step 310, where the switch analyzes each packet to determine whether the packet is a BOOTP/DHCP request or a discover packet. If it is a request or discover packet, the packet is from a client, and the method proceeds to step 315.

At step 315, the switch determines whether the packet is a BOOTP request. If the packet is a BOOTP request, the method proceeds to step 320, where the packet is added to the BOOTP queue. Then, at step 325, the timeout is set for the packet.

If the switch determines the packet is not a BOOTP request at step 315, the method proceeds to step 330 for DHCP packet handling. At step 330, the packet is added to the DHCP queue. Then, at step 335, the timeout is set for the packet. As noted above, the DHCP timeout is typically longer than the BOOTP timeout. After the timeout is set, other ingress handling can be performed.

If, at step 310, the switch determines that the packet is not a request or a discover packet from a client, then the packet is a reply from a server. The method proceeds to step 340. At step 340, if the packet is not a DHCP offer or acknowledgement (ACK), the method ends and other ingress handling is performed. If the packet is a DHCP offer or ACK, the method proceeds to step 345.

At step 345, the switch determines if the packet contains the MAC address of the destination of the packet (i.e., the MAC address of the client that sent the DHCP request). If the MAC address of the destination is stored in the queue, the packet is forwarded to the destination client and the method proceeds to step 355. At step 355, the packet associated with the request is deleted from the queue, if necessary. If the MAC address of the destination is not stored in the queue, then the switch has received a response to a DHCP request for one of the broadcast messages that was transmitted by the switch. The method then proceeds to step 350. At step 350, the server information is added to cache records 212 so that future requests can be unicast to the appropriate server using the cached server information. Finally, the method proceeds to step 355 where the packet associated with the client that sent the request is deleted from the queue, if necessary. In some embodiments, packets associated with broadcast messages may have already been deleted from the queue when the request was broadcast, as described above.

Figure 4:
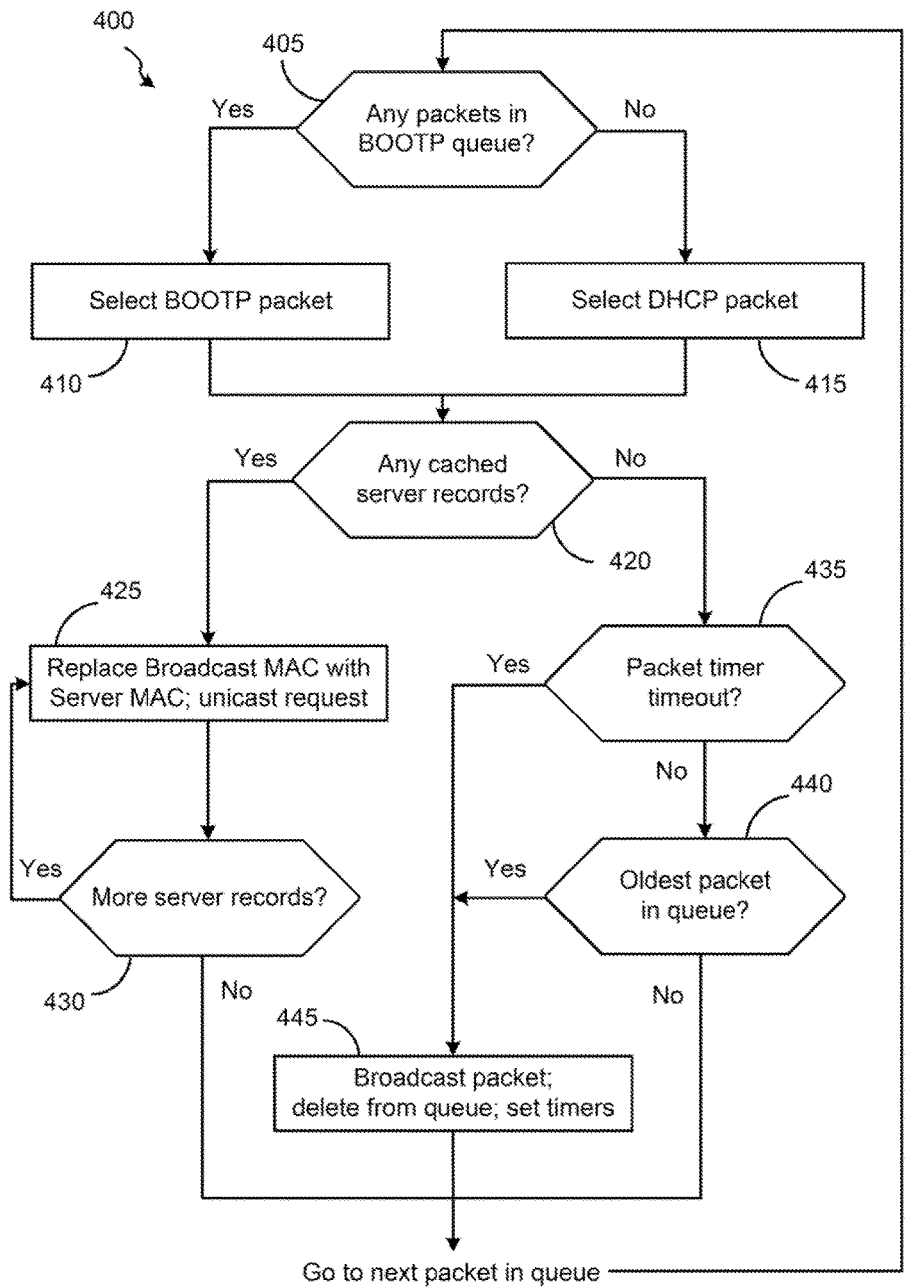
FIG. 4 is a flow diagram illustrating a method for DHCP broadcast conversion.

FIG. 4 is a flow diagram that illustrates a method 400 for DHCP broadcast conversion, according to one embodiment of the present invention. Although the method steps are described in conjunction with FIGS. 1-2, any system configured to perform the method steps, in any suitable order, falls within the scope of the present invention. In various embodiments, a virtual switch or physical switch can perform the steps illustrated in FIG. 4, such as the virtual switches and physical switches illustrated in FIGS. 1A and 1B. Conversion engine 214 can perform the steps of FIG. 4.

The method 400 begins at step 405, where conversion engine 214 determines whether there are any packets in the BOOTP queue. If there are packets in the BOOTP queue, the method proceeds to step 410 where a BOOTP packet is selected from the BOOTP queue. If there are no packets in the BOOTP queue, the method proceeds to step 415, where a DHCP packet is selected from the DHCP queue. These steps illustrate that the BOOTP queue is given priority over the DHCP queue. After a packet is selected from either the BOOTP queue or the DHCP queue, the method proceeds to step 420.

At step 420, conversion engine 214 determines if there are any cached server records stored in cache records 212. If there are records stored, the method proceeds to step 425. At step 425, the broadcast MAC is converted to a MAC stored in the stored record, and a request is unicast to the specific server. At step 430, conversion engine 214 checks if there are more server records stored in cache records 212. If there are more server records stored there, the method returns to step 425 and another request is unicast to the additional server. This process is repeated for each server that is stored in cache records 212. In some embodiments, the broadcast domain information for the DHCP/BOOTP server is also stored in cache records 212 so that the messages are unicast only to the servers in the proper broadcast domain. For example, VLAN or VXLAN information can be used to separate broadcast domains into smaller parts. A header in the packet may contain VLAN or VXLAN information. In addition, some clients may need to retrieve information from a particular server. Messages can be unicast to the particular server in those instances as well.

At step 430, if there are no more server records, the method proceeds to the next packet in the queue at step 405.

If, at step 420, there are no cached server records stored in cache records 212, the method proceeds to step 435. At step 435, conversion engine 214 determines if the packet timer has timed out. If a timeout has occurred, the method proceeds to step 445 and the packet is broadcast to the broadcast domain and deleted from the queue. The packet is broadcast at this step after the timeout so that packets do not sit in the queue forever waiting for server information to eventually be stored in cache records 212. Then, the method 400 proceeds to the next packet in the queue at step 405.

If the packet timer has not timed out at step 435, the method proceeds to step 440. At step 440, conversion engine 214 checks to see if the packet is the oldest packet in the queue. If it is the oldest packet in the queue, the method proceeds to step 445 and the oldest packet is broadcast and deleted from the queue. A timer can also be set for this broadcast, so that another packet that is now the oldest packet in the queue is not broadcast until a response is received from the earlier oldest packet or the timer expires. The packet timeouts from step 435 can be set for a longer time than this broadcast timeout so that the packet timeouts allow adequate time for a reply to the oldest packet to be received. After step 445, the method returns to step 405 for the next packet in the queue. If, at step 440, the packet is not the oldest packet in the queue, the method returns to step 405 for the next packet in the queue.

Figure 5:
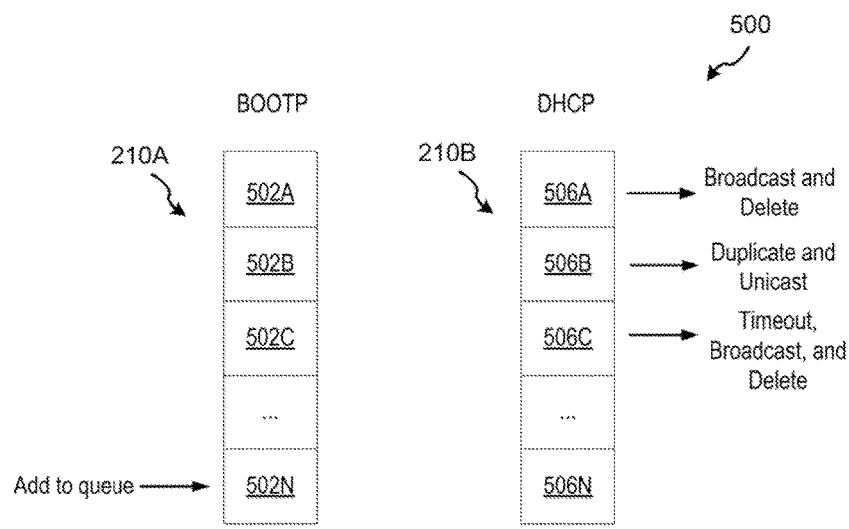
FIG. 5 illustrates buffer queues according to an embodiment.

FIG. 5 illustrates a buffer queue management system 500 according to an embodiment. Illustrated in the buffer queue management system 500 are a BOOTP queue 210A and a DHCP queue 210B. Packets are added to the queues via ingress data path 202 and broadcast intercept 206, illustrated in FIG. 2. The broadcast intercept 206 sub-module identifies each packet as either a BOOTP or DHCP broadcast packet, and places the packet into the appropriate queue 210. Packets can also be marked with the MAC of the client that transmitted the request. A timer is also set for each packet.

In the BOOTP queue 210A, the first packet (packet 502A, i.e., the oldest packet) is broadcast when it is placed into the queue. Other packets (502A, 502B, . . . 502N) are placed into queue 210A as they are intercepted. Once information about the server is received in response to the broadcast, that information is stored in cache records 212. The packets stored in queue 210A are converted to unicast requests by conversion engine 214. Then the packets are unicast to the BOOTP server. The packets are deleted after a reply is received.

For the DHCP protocol, a typical transaction involves the client sending a broadcast discovery request and a server replying with an offer of an available IP address. A client may receive multiple offers from different servers. The client chooses one offer and sends an IP lease request to that server. The server then replies with an acknowledgement (ACK). The ACK means that the offered IP address has been assigned to the client.

In queue 210B, the first DHCP packet (packet 506A, i.e., the oldest packet) is broadcast to the broadcast domain and then deleted in one example embodiment. Other DHCP discovery request packets are intercepted by broadcast intercept 206 sub-module and stored in queue 210B. Once information for an available DHCP server is received and stored in cache records 212, other packets 506B, 506C, . . . 506N in queue 210B are duplicated, converted to unicast, and transmitted to the available DHCP server. The packet is duplicated so that a copy of the packet remains in the queue while the duplicate is transmitted. If the DHCP server does not reply to the packet that was unicast before the unicast request times out, the copy of the packet in queue 201B will be broadcast to the broadcast domain to find another server. This step is performed in case the available DHCP server goes down at some point before the system has completed the DHCP protocol process of assigning an IP address to the client associated with the unicast packet.

Figure 6:
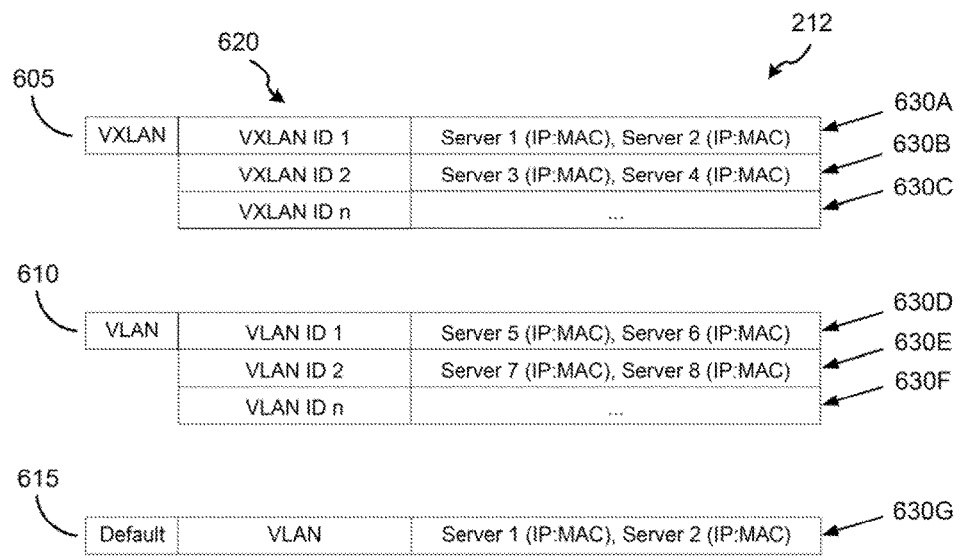
FIG. 6 illustrates DHCP server cache records management according to an embodiment.

FIG. 6 illustrates DHCP server cache records management according to an embodiment. In this example, cache records 212 for DHCP server information is illustrated. Device records are stored in separate lists according to broadcast domains, such as VXLAN 605, VLAN 610, or Default 615 (no VXLAN or VLAN). When a reply to a broadcast message is received from a DHCP server, the relevant server information is reviewed to determine if it is already stored in cache records 212. If it is not already saved, it will be stored in cache records 212. The VXLAN ID or VLAN ID is stored in column 620.

Each ID 620 comprises server information 630A-630G for the servers within that broadcast domain, or server information for the default servers. Entries 630A-630G illustrate various DHCP server information that is stored in cache records 212. For example, entry 630A illustrates Server 1 and Server 2 for VXLAN ID 1. As another example, entry 630D illustrates Server 5 and Server 6 for VLAN ID 1. Servers are also shown for the other broadcast domains. The default servers in this example are Server 1 and Server 2, illustrated in entry 630G.

If the information that is stored is the first record stored for a specific broadcast domain, a timer is set. The timer is set to periodically remove the server record list in a broadcast domain. This step is performed to remove the server records periodically in case a server changes or stops working. If a client sends another request for server information, a message is broadcast to rediscover the server or to find a new server. Periodically cleaning up the records in this manner is needed to remove downed servers. It also ensures that cache records 212 has relatively fresh server information.

Although not illustrated, BOOTP server information can be stored in cache records 212 similarly to the DHCP information shown in FIG. 6. In some embodiments, the DHCP server may be the same server as the BOOTP server.

Figure 7:
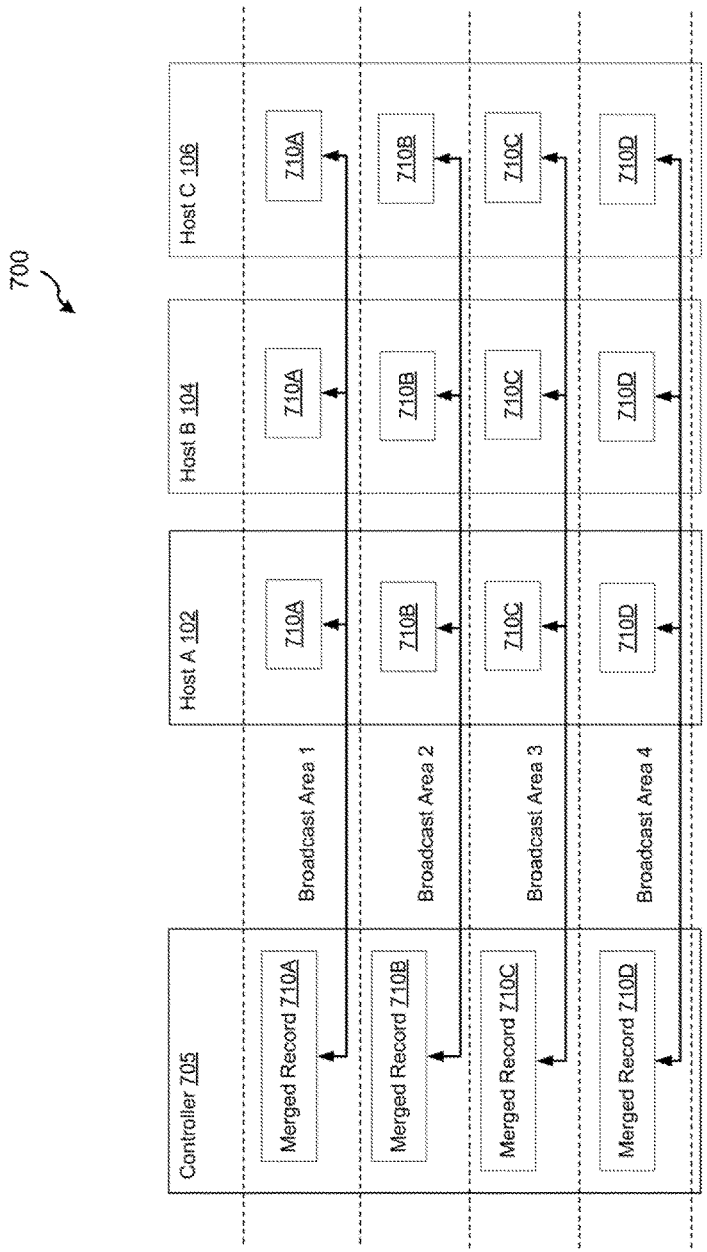
FIG. 7 illustrates a controller and broadcast domains under its management, according to an embodiment.

FIG. 7 illustrates a system 700 that includes a controller 705. Controller 705 manages cache records of all of its associated broadcast domains. Controller 705 directly communicates with each device on each host (such as VMs 120A, 120B, and 120C in host A 102, illustrated in FIG. 1A). Hosts 102, 104, and 106 are illustrated in FIG. 7. Hosts may also communicate with one another via a separate management channel (not shown). When configuration server information is received by a device, that information may be sent to controller 705, which merges the information into merged records 710A-710D. Then, the information stored in the appropriate merged records 710A-710D can be distributed to the other devices in that broadcast domain, no matter which host the device resides on. This process synchronizes the server information among the hosts. For example, if Host A 102 broadcasts a configuration request and finds a DHCP server, Host B 104 does not need to rediscover that DHCP server again. Host B 104 can receive the server information directly from controller 705 and store the information in a switch in Host B 104. Then, the switch in Host B 104 can use that information to unicast requests to the appropriate server for the devices in Host B 104.

If two VMs on different hosts start at the same time or nearly the same time, it is possible that requests from each VM will be broadcast before server information is synchronized across hosts. For example, referring to FIG. 1A, VM 120A in Host A 102 starts up and a DHCP request is broadcast for VM 120A. A VM on another host, such as VM 122A in Host B 104, starts up shortly after VM 120A started, and Host B 104 buffers the DHCP request from VM 122A. Host B 104 then checks for server information stored in cache records 212. If VM 120A has not yet received server information from the DHCP server, and/or controller 705 has not yet synchronized the server information across the various hosts, then no server information will be stored in cache records 212. Therefore the DHCP request from VM 122A will also be broadcast. However, once server information has been received at one of the hosts and controller 705 has synchronized the server information across all hosts, new DHCP requests will be buffered into the appropriate queues and unicast to the DHCP server.

One advantage of the above described embodiments is that the number of broadcast messages is reduced, which reduces the chances of a broadcast storm in the network environment. Another advantage is improved network efficiency when a large number of clients are present in the network.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the client or endpoint and hypervisors as an example for the hardware abstraction layer. As described above, each virtual machine includes a guest operating system in which at least one application runs. These embodiments may also apply to other examples of endpoints/clients, such as containers, which do not include a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for suppressing broadcast messages in a network with a plurality of host devices, the method comprising:
   receiving a broadcast message from a client, the broadcast message requesting configuration information from a configuration server;
   queuing the broadcast message in a request queue;
   identifying an oldest message in the request queue;
   when no configuration server information is available, broadcasting the oldest message to a broadcast domain;
   intercepting one or more additional broadcast messages from one or more other clients and storing the additional broadcast messages in the request queue;
   receiving a reply to the oldest message and storing configuration server information extracted from the reply;
   converting the additional broadcast messages to unicast messages; and
   unicasting the unicast messages to the configuration server using the stored configuration server information.

2. The method of claim 1, further comprising setting a timer for each additional broadcast message in the request queue, and broadcasting each additional broadcast message when its respective timer expires.

3. The method of claim 1, further comprising setting a timer for the stored configuration server information, and deleting the stored configuration server information when the timer expires.

4. The method of claim 1, further comprising:
   transmitting the stored configuration server information to a host; and
   storing the configuration server information in a switch at the host.

5. The method of claim 1, wherein the configuration server information comprises a broadcast domain.

6. The method of claim 1, wherein the configuration server information comprises dynamic host configuration protocol (DHCP) server information.

7. The method of claim 1, wherein a switch converts the additional broadcast messages to unicast messages.

8. A non-transitory computer-readable storage medium containing a program which, when executed by one or more processors, performs operations for suppressing broadcast messages in a network, the operations comprising:
   receiving a broadcast message from a client, the broadcast message requesting configuration information from a configuration server;
   queuing the broadcast message in a request queue;
   identifying an oldest message in the request queue;
   when no configuration server information is available, broadcasting the oldest message to a broadcast domain;
   intercepting one or more additional broadcast messages from one or more other clients and storing the additional broadcast messages in the request queue;
   receiving a reply to the oldest message and storing configuration server information extracted from the reply;
   converting the additional broadcast messages to unicast messages; and
   unicasting the unicast messages to the configuration server using the stored configuration server information.

9. The non-transitory computer-readable storage medium of claim 8, wherein the operations further comprise setting a timer for each additional broadcast message in the request queue, and broadcasting each additional broadcast message when its respective timer expires.

10. The non-transitory computer-readable storage medium of claim 8, wherein the operations further comprise setting a timer for the stored configuration server information, and deleting the stored configuration server information when the timer expires.

11. The non-transitory computer-readable storage medium of claim 8, wherein the operations further comprise:
   transmitting the stored configuration server information to a host; and
   storing the configuration server information in a switch at the host.

12. The non-transitory computer-readable storage medium of claim 8, wherein the configuration server information comprises a broadcast domain.

13. The non-transitory computer-readable storage medium of claim 8, wherein the configuration server information comprises dynamic host configuration protocol (DHCP) server information.

14. The non-transitory computer-readable storage medium of claim 8, wherein a switch converts the additional broadcast messages to unicast messages.

15. A system, comprising:
   a processor; and
   a memory, wherein the memory includes a program executable in the processor to perform operations for suppressing broadcast messages in a network, the operations comprising:
   receiving a broadcast message from a client, the broadcast message requesting configuration information from a configuration server;
   queuing the broadcast message in a request queue;
   identifying an oldest message in the request queue;
   when no configuration server information is available, broadcasting the oldest message to a broadcast domain;
   intercepting one or more additional broadcast messages from one or more other clients and storing the additional broadcast messages in the request queue;
   receiving a reply to the oldest message and storing configuration server information extracted from the reply;
   converting the additional broadcast messages to unicast messages; and
   unicasting the unicast messages to the configuration server using the stored configuration server information.

16. The system of claim 15, wherein the operations further comprise setting a timer for each additional broadcast message in the request queue, and broadcasting each additional broadcast message when its respective timer expires.

17. The system of claim 15, wherein the operations further comprise setting a timer for the stored configuration server information, and deleting the stored configuration server information when the timer expires.

18. The system of claim 15, wherein the operations further comprise:
   transmitting the stored configuration server information to a host; and
   storing the configuration server information in a switch at the host.

19. The system of claim 15, wherein the configuration server information comprises a broadcast domain.

20. The system of claim 15, wherein a switch converts the additional broadcast messages to unicast messages.

* * * * *